United States Patent [19]

Ehlert et al.

[11] 4,452,432
[45] Jun. 5, 1984

[54] FLAME CUTTING ROLLERBED FOR USE IN CONTINUOUS METALLIC STRAND CASTING MILLS

[75] Inventors: Klaus-Peter Ehlert, Moers; Dietmar Zebrowski, Straelen, both of Fed. Rep. of Germany

[73] Assignee: Mannesmann Aktiengesellschaft, Dusseldorf, Fed. Rep. of Germany

[21] Appl. No.: 404,692

[22] Filed: Aug. 4, 1982

[30] Foreign Application Priority Data

Aug. 12, 1981 [DE] Fed. Rep. of Germany ....... 3131830
May 19, 1982 [DE] Fed. Rep. of Germany ....... 3218925

[51] Int. Cl.³ .............................................. B23K 7/02
[52] U.S. Cl. ................................................... 266/50
[58] Field of Search .......................... 266/50; 148/9 R

[56] References Cited

U.S. PATENT DOCUMENTS

| | | | |
|---|---|---|---|
| 3,443,803 | 5/1969 | Wernicke | 266/50 |
| 3,511,489 | 5/1970 | Field | 266/50 |
| 3,788,620 | 1/1974 | Lotz | 266/50 |
| 4,001,051 | 1/1977 | John | 266/50 |
| 4,202,707 | 5/1980 | Hennecke | 266/50 |

FOREIGN PATENT DOCUMENTS 2408855 7/1977 Fed. Rep. of Germany .
2550161 6/1981 Fed. Rep. of Germany .

*Primary Examiner*—W. Stallard
*Attorney, Agent, or Firm*—Mandeville and Schweitzer

[57] ABSTRACT

A flame cutting rollerbed which is specifically intended for use in metal strand casting plants serves to cut metal strands longitudinally and/or transversely. A flame cutting rollerbed of this type comprises uniformly spaced support rollers which are arranged across the longitudinal motion direction of the cast strands. The support rollers are each equipped with spaced disk rollers on the edges of which the metal strands contact and are supported.

In order to protect the stationary support rollers from being damaged by the flame cutting jet, it is proposed that sections between adjacent disk rollers be coated with a porous protective coating which is resistant to the heat flow of the flame cutter jet. The protective coating is either metal-porous or ceramic-porous. Furthermore, the coating may be cooled by a cooling fluid, in which case the porous protective coating forms storage spaces for the cooling fluid. Nozzles for the cooling fluid are arranged opposite the disk rollers and/or the support rollers.

8 Claims, 2 Drawing Figures

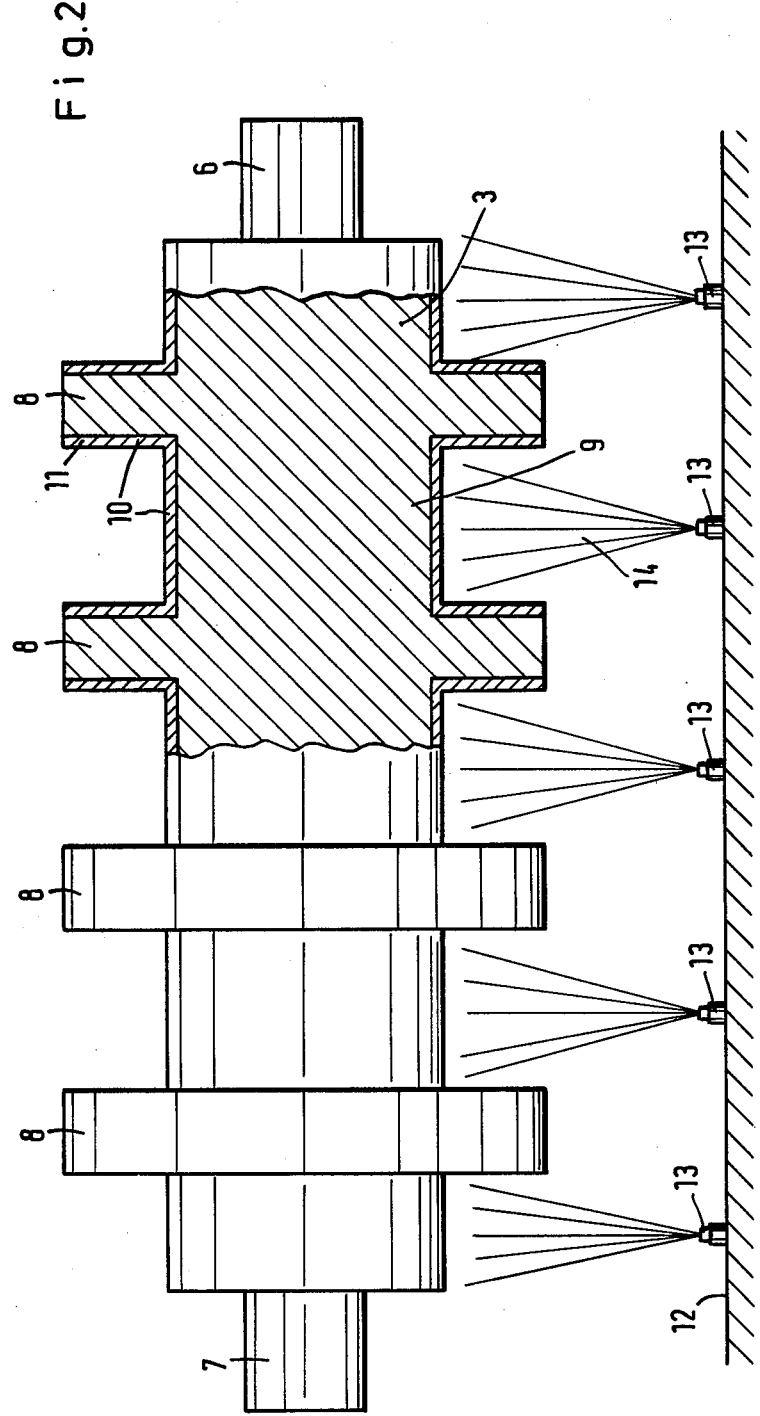

FLAME CUTTING ROLLERBED FOR USE IN CONTINUOUS METALLIC STRAND CASTING MILLS

BACKGROUND OF THE INVENTION AND DESCRIPTION OF THE PRIOR ART

The present invention is directed to a flame cutting rollerbed, particularly for use in metallurgical continuous cast strand plants, which flame cutting rollerbeds are useful for cutting metal strands longitudinally and/or transversely. The supporting rollerbed comprises uniformly spaced conveyor elements (often referred to as support rollers) arranged across the direction that the cast strands move. The conveyor elements are each equipped with uniformly spaced disk rollers. The metal strands contact and are supported by the disk rollers as the strands cool. The present invention is also directed to a method for operating a continuous cast metallic strand flame cutting rollerbed.

The flame cutting process for metallic strands is intended to occur on the flame cutting rollerbed of the present invention. This process presupposes the existence of a flame cutting device which is movable along the direction that the cast metallic strands move. In addition, a flame cutter can be provided which is transversely displaceable in the direction that the cast metal strands move. Transversely cutting the metal strands is particularly useful in, for example, cutting steel strands which are moving at steel casting speed.

In the longitudinal cutting of metal strands such as, for example, continuous cast plate slabs, a transversely adjustable flame cutter is necessary only for adjusting the width of the section to be cut off.

In either case, i.e., transverse cutting or longitudinal cutting, the flame cutter moves relative to the metal strand. When cutting transversely, an angular line of movement results from the locus of points corresponding to the leading edges of the metal strands during the flame cutting action relative to the center line of the flame cutting rollerbed.

Whether cutting longitudinally or transversely, the cutting jet of the flame cutter passes over the disk rollers and/or the sections located between the spaced disk rollers. It is quite possible that the rollers get damaged by the high heat flow, by slag spatter, or by similar occurrences.

It has already been proposed (U.S. Pat. No. 3,511,489) to rotate the support rollers away from the cutting site as the torch or flame cutting jet approaches the metallic strand, which solution, however, results in no support being provided to the strand during cutting.

Previously, the suggestion has also been made (DE-B2-24 08 855), in order to minimize the time that the metal strand is without support while the rollers are turned or rolled away, to pivot the support rollers through the flame cutting jet while simultaneously rotating them downwardly and away and then backwardly and up into their original starting position. This solution, however, requires rollers which are basically movable.

According to yet another known suggestion (DE-B2-25 50 161), all of the rollers are located on a roller table, which table is separate from the rollerbed. The table is movable back and forth along the direction of the strands longitudinal axes. One motion of the roller table occurs as the flame cutting jet approaches, and removal of the respective support rollers from the flame cutter jet is caused by the other motion of the table. The motion control machinery necessary for this type of operation is, however, expensive in equipment and maintenance.

SUMMARY OF THE INVENTION

Compared to the prior art, the object of the present invention is to accomplish that which a rollerbed ordinarily is expected to accomplish, however, without movement of the support rollers. The present invention thus serves to save hydraulic controls and hydraulic drives with the ultimate aid being the simplification of the flame cutting rollerbed.

The problems of the prior art devices are solved by the present invention by providing a coating to at least the sections between adjacent disk rollers of the support rollers. The coating material has a porous protective characteristic which is, consequently, resistant to the high heat flow of the flame cutting jet. Experience has shown that the flame cutting jet hits, but only momentarily, the supporting rollers which rotate below the movement of the metal strands. Furthermore, the rollers are only exposed to the fringe or peripheral cutting area of the flame cutting jet. The protective coating, therefore, represents an effective and sufficient precautionary measure to avoid damage to the support rollers. Further measures such as, for example, rotating the rollers away, moving the roller table back and forth, etc. are no longer necessary and, therefore, the flame cutting rollerbed of the present invention has considerably fewer elements. The present invention essentially simplifies the rollerbed and results in lower total expenditures for such a device.

The present invention also provides that the side surfaces of the individual disk rollers also be coated with the protective coating which results in extensive protection against damage for the individual disk rollers.

In the preferred embodiment, the protective coating is either a metalporous or a ceramic-porous material.

A further protective measure against damage to the support rollers and/or disk rollers is provided in that the porous protective coating may be sprayed with a cooling fluid emanating from the inside or the outside of the support rollers.

The present invention is especially advantageous in that the porous protective coating forms storage spaces for receiving microfine particles of the cooling fluid.

It is advantageous for charging the protective coating with cooling fluid such that the nozzles for the cooling fluid are arranged opposite each of the respective disk rollers or, if applicable, in between the disk rollers.

Flame cutting of continuously cast metallic strands can now proceed, according to the present invention, without any risk of damage to the support rollers if the flame cutting rollerbed is adjusted such that the relative speed of the flame cutter, adjusted above the direction of the strands motion, is continuously harmonized to the speed of the strands such that the flame cutting line extends between each of two adjacently arranged disk rollers of a supporting roller and between another pair of adjacently arranged disk rollers of the following support roller.

Also according to the present invention, at least the sections of the support rollers located between adjacent disk rollers are coated with a protective coating which is welded thereon. The coating is cooled from the outside and is thus resistant to the heat flow from the flame cutting jet. The coating is predominantly formed from nickel and chromium alloys. Tests have shown that such a protective coating, with a corresponding cooling system, is not only resistant to the heat of the flame cutting jet but is also effective in specifically repulsing flame cutting slag. The beneficial effects, according to the invention, occur with a minimum combined content of nickel and chromium of 50% of the total alloy composition.

A particularly advantageous composition for the protective coating is 70% nickel, 20% chromium, and a remainder of 10% of molybdenum, niobium or columbium and iron.

An exemplary embodiment of the invention is illustrated in the drawing and further detailed as follows:

BRIEF DESCRIPTION OF THE DRAWINGS

FIG. 2 is a partial horizontal cross sectional view of an individual support roller and disk rollers, according to the present invention, taken along lines II—II of FIG. 1.

DETAILED DESCRIPTION OF THE DRAWINGS

Figure 1:
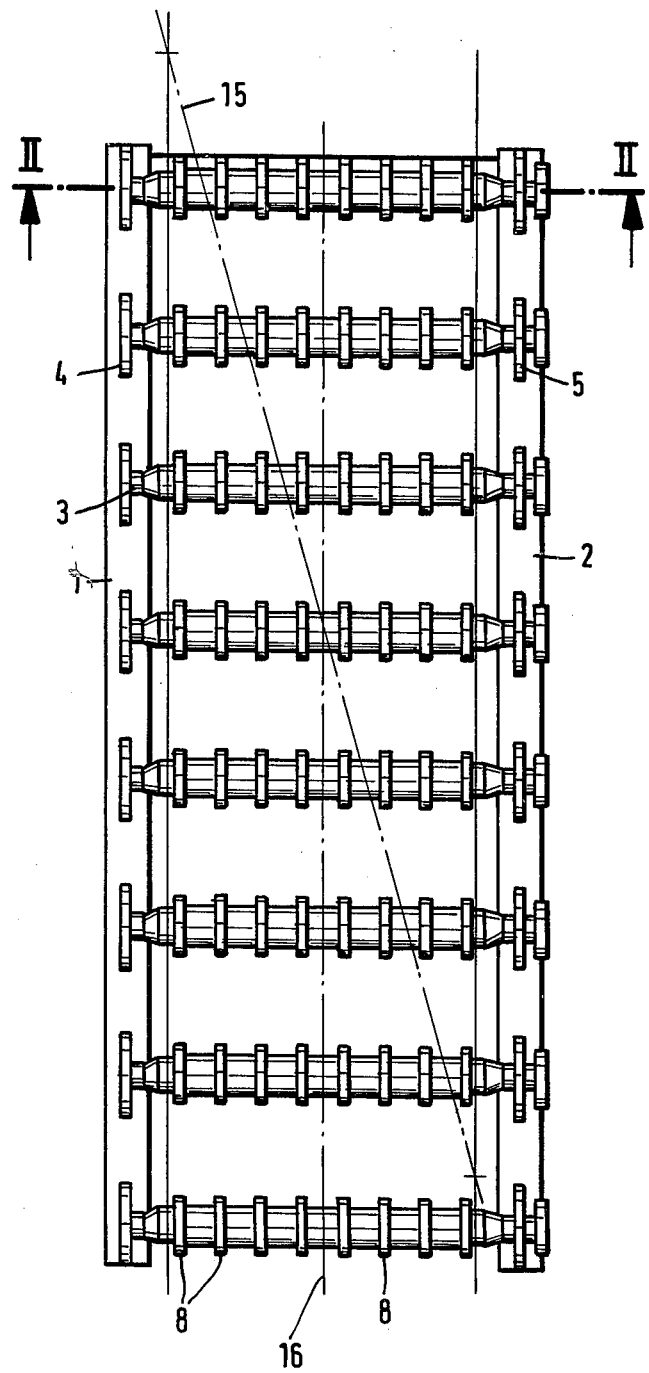
FIG. 1 is a top plan view of the flame cutting rollerbed, according to the present invention.

The support rollers 3, pivotably held in pivot bearings 4 and 5 by shaft ends 6 and 7 (see FIG. 2) are supported on bearing foundation bases 1 and 2. The illustrated eight support rollers 3 are, therefore, stationary with respect to foundation bases 1 and 2 and merely freely rotate in their pivot bearings 4 and 5 or, where necessary, are driven by a rotating drive (not further illustrated).

Every support roller 3 is provided with at least two individual disk rollers 8 which are uniformly laterally spaced, arranged and mounted on the support rollers 3. This arrangement results in sections 9 being located between each of two adjacent disk rollers 8. These sections 9 are coated with protective coating 10 which is comprised of metal-porous or ceramic-porous materials. In addition to the sections 9, the side surfaces 11 (see FIG. 2) of the disk rollers 8 are also coated with the protective coating 10.

On the mill floor or at a unified nozzle support bar 12, spray nozzles 13 are connected to a source of cooling fluid 14, such as for example water, which is jet-sprayed against the protective coating 10. During the spraying process, microfine storage spaces, within the metallic and/or ceramic protective layer, receive, for example, water in finely diffused form, which has the beneficial effect of cooling, by evaporating on the surfaces of the disk rollers facing the flame-retarding nozzles and of preventing the increased heat-up of the protective coating 10.

A flame cutter jet (not illustrated) passes above the cast and cooling metal strands, (the strands are schematically indicated by two parallel lines) along the flame cutting line 15 (FIG. 1). In this case, the flame cutting jet essentially moves across the centers of the sections 9 so that an especially small diameter of the section 9 is effective in relation to the diameter of the individual disk rollers 8. The ratio of the diameter of sections 9 to the diameter of roller disks 8, is advantageously set 1:1.7 or less.

The lateral spacings between the disk rollers 8 create a further advantageous factor for influencing the flame cutting time for a transversely cutting process, i.e., to make the path of the flame cutting line 15 more or less angular in relation to the metal strands center line 16.

The teachings of the attached copy of the corresponding German Application, upon which this application claims priority, is herein specifically incorporated by reference.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

We claim:

1. A flame cutting rollerbed for cutting continuous cast metal strands in either the longitudinal and/or traverse direction with respect to the direction of motion of the cast metal strands, comprising
   (a) at least two support rollers arranged behind one another in the direction of motion of the cast metal strands;
   (b) each of said support rollers being provided with uniformly spaced-apart disk rollers for providing direct support to the cast metal strands; and
   (c) the sections of said support rollers located between said disk rollers having porous protective coating which is heat resistant.

2. A flame cutting rollerbed as claimed in claim 1, wherein:
   (a) the side surfaces of said disk rollers are also coated with said protective coating.

3. A flame cutting rollerbed as claimed in claim 1, wherein:
   (a) said protective coating is either of a metal porous or ceramic porous composition.

4. A flame cutting rollerbed as claimed in claim 1, wherein:
   (a) said protective coating is cooled by a cooling fluid.

5. A flame cutting rollerbed as claimed in claim 4, wherein:
   (a) said protective coating has storage spaces for said cooling fluid.

6. A flame cutting rollerbed as claimed in claim 4, wherein:
   (a) nozzles for directing said cooling fluid are arranged opposite said disk rollers.

7. A flame cutting rollerbed for use in the cutting of metal strands being continuously cast, comprising
   (a) support rollers, arranged beneath said metal strands and spaced across the direction of the motion of said strands;
   (b) each of said support rollers carrying a plurality of spaced disk rollers, on which said metal strands are supported;
   (c) the sections between said disk rollers being coated with a welded-on, protective coating;
   (d) said coating being cooled by cooling means and resistant to the heat flow from a flame cutting jet; and
   (e) said coating comprised of predominantly nickel and chromium.

8. A flame cutting rollerbed as claimed in claim 7, wherein:
   (a) said coating comprises 70% nickel, 20% chromium and a remaining amount of molybdenum, niobium, columbium and iron.

* * * * *